United States Patent [19]

O'Brien et al.

[11] Patent Number: 5,736,701
[45] Date of Patent: Apr. 7, 1998

[54] ELECTRICAL SWITCH APPARATUS RESPONSIVE TO GEAR SELECTION OF VEHICULAR TRANSMISSION AND METHOD OF ASSEMBLY THEREOF

[75] Inventors: Edward F. O'Brien, West Warwick; Gary A. Baker, North Scituate, both of R.I.; Carleton M. Cobb, III, East Walpole, Mass.

[73] Assignee: Texas Instruments Incorporated, Dallas, Tex.

[21] Appl. No.: 648,781

[22] Filed: May 16, 1996

[51] Int. Cl.⁶ .............................. H01H 9/06
[52] U.S. Cl. ............................. 200/61.88
[58] Field of Search .................. 200/61.88, 61.89, 200/61.91, 83 N, 83 P, 11 G, 11 J, 11 K, 11 R

[56] References Cited

U.S. PATENT DOCUMENTS

| | | |
|---|---|---|
| 5,191,178 | 3/1993 | Baker .................. 200/61.88 |
| 5,325,083 | 6/1994 | Nassar et al. ............ 340/456 |
| 5,338,907 | 8/1994 | Baker et al. ............ 200/61.88 |
| 5,440,087 | 8/1995 | Cobb, III ............... 200/61.88 |
| 5,525,768 | 6/1996 | Cobb, III et al. ........ 200/61.88 |
| 5,561,416 | 10/1996 | Marshall et al. ......... 340/456 |

FOREIGN PATENT DOCUMENTS

WO 92/17719  10/1992  WIPO .

*Primary Examiner*—Adolf Berhane
*Attorney, Agent, or Firm*—Russell E. Baumann; Richard L. Donaldson; Rene' E. Grossman

[57] ABSTRACT

An electric switch system (10) for use with a motor vehicle transmission has a movable contact assembly (22) mounted on the detent lever (12) linked to the manual valve assembly and a stationary contact assembly (18) mounted in an open housing (16) disposed over one face surface of the detent lever and in facing relation therewith. The housing has a plurality of L-shaped attachment projections (24a, 24b, 24c) each with a leg (24d, 24e, 24f) which, when the switch system is assembled, extends over the opposite face surface (12c) of the detent lever. A locking projection (24g) of the housing is received in a cut-out (12g) of the detent lever when the attachment projections are out of alignment with the detent lever and has a leg (24h) which extends over the opposite face surface (12c) of the detent lever when the housing (16) is rotated relative to the detent lever so that the attachment projections are in alignment with the detent lever. The housing has a pair of prongs (16d) which receive the roller (26) of the roller/spring assembly (28) to maintain the housing in a fixed angular position. An optional removable lock member (34) is shown to maintain the switch system components in a fixed position prior to installation in a transmission. A modified high current embodiment has a stationary contact assembly (18') with pairs of rails (18c') which lift respective movable contact elements (22a') to break a respective electric circuit at selected angular positions of the detent lever.

12 Claims, 5 Drawing Sheets

ELECTRICAL SWITCH APPARATUS RESPONSIVE TO GEAR SELECTION OF VEHICULAR TRANSMISSION AND METHOD OF ASSEMBLY THEREOF

FIELD OF THE INVENTION

This invention relates generally to vehicular transmissions and more particularly to electrical switches for providing an electrical signal responsive to the position of a manual shaft and detent lever associated with such transmissions.

BACKGROUND OF THE INVENTION

It is conventional to mount a rotary switch on a transmission housing externally thereof to receive mechanical gear selection inputs from the operator of a vehicle through various linkages and output gear selections to appropriate output means such as a decoder module and the transmission electronic control unit via electronic signals. The switch includes a quadrant with a selected number of electrical switch segments disposed thereon with each segment providing an output to the output means. A manual valve controlling hydraulic operation of the transmission is mechanically coupled to a plate having indexing detents, called a detent lever, mounted on a shaft and pivotably movable therewith. The shaft extends through the transmission housing wall and a switch bar is fixedly attached to the shaft externally of the transmission housing so that when a vehicle operator selects a gear the switch bar within the rotary switch moves across the quadrant to a predetermined position to engage one or more of the electrical segments. In certain systems the electronic control monitors the gear position along with other inputs, for example, throttle position, output shaft speed, engine speed, engine load and so on.

In U.S. Pat. No. 5,338,907, assigned to the assignee of the present invention, a switch system is disclosed which is mounted within the transmission housing in order to avoid placing the switches in a hostile environment subject to water splash and the like as well as to avoid tolerance stack-up problems associated with linkages employed when mounting the switches externally of the transmission housing. In that patent a switch housing is shown mounted on the manual lever shaft. The housing is coupled to a roller attached to the detent spring which biases the roller into engagement with the outer edge of the detent lever to maintain the housing stationary relative to the transmission housing. A switch arm fixedly mounted on the manual lever shaft mounts a plurality of first electrical contacts and extends into the switch housing. The switch arm, movable with the detent lever, moves into and out of engagement with respective second electrical contacts mounted in the switch housing. Although transmission fluid can enter and leave the switch housing, seals are provided to prevent ingress of metal particles and other debris into the switch housing.

While the above switch system is effective, space available for placement of components, such as the switch system, becomes more and more limited and problematic with each new vehicle and transmission design.

SUMMARY OF THE INVENTION

It is an object of the present invention to provide a switch system particularly useful with motor vehicle transmissions which occupies less space than switch systems of the prior art. Another object of the invention is the provision of an improved switch system which is of low cost, yet reliable, and one having a long life expectancy. Yet another object is the provision of an improved method for assembling such a switch system.

Other objects, advantages and details of the switch system and method of assembling of the invention appear in the following detailed description of preferred embodiments of the invention.

Briefly, in accordance with the invention, a movable electrically conductive contact assembly is mounted directly on a first face surface of the detent lever of the manual valve assembly. A generally flat quadrant shaped housing member, formed of electrically insulative material, is rotatably mounted on the manual shaft in a position adjacent to and overlying the detent lever. A stationary, electrically conductive contact assembly is disposed on a face of the housing member overlying the first face surface of the detent lever. A plurality of generally L-shaped attachment projections, extending from the outer periphery of the housing member, have legs spaced from the face of the housing member extending toward the manual shaft receiving bore so that the legs extend over at least a portion of the opposite, second face surface of the detent lever. A generally L-shaped locking projection, extending from the housing, is received through a cut-out portion of the detent lever when the attachment projections are out of alignment with the detent lever. Following insertion of the locking projection through the cut-out portion, rotation of the housing relative to the detent lever will cause a leg of the locking projection to move over at least a portion of the second face surface of the detent lever when the attachment projections are aligned with the detent lever. The housing member is provided with a pair of prongs which receive therebetween the roller of the roller/spring assembly to thereby maintain the housing member in a selected X-Y position. The distance between the legs of the attachment and locking projections from the face surface of the housing member determines the position of the housing member in the Z direction in cooperation with a spring bias provided by the movable contact assembly.

According to a feature of the invention, the stationary contact assembly has a plurality of arc-shaped contact segments separated from one another in a radial direction by rib members which extend from the surface of the housing a selected distance beyond the contact segments to thereby prevent short circuiting between adjacent contact segments by debris or the like. Any debris which enters the contact chamber is then pushed out through an open end of the housing member by the movable contacts as the detent lever rotates.

According to another feature of the invention, a removable locking member has a first tongue receivable between the prongs of the housing member into a detent of the detent lever and a second tongue receivable through a slot in one of the attachment projections to maintain the switch assembly components in a fixed position prior to installation of the switch apparatus in a transmission.

According to a modified, relatively higher current switch system embodiment, a pair of electrically insulative rails is disposed with one rail of the pair on either side of each stationary contact segment at selected angular positions. The rails extend above the surface of the housing a selected distance beyond the stationary contact segments. The movable contact elements are cantilever spring elements having a distal free end biased toward the stationary contact segments. The distal free ends have a width greater than the spacing between each pair of rails so that respective circuits are interrupted by the rails lifting the movable contact elements away from selected contact segments as the detent lever is rotated.

The invention accordingly comprises the constructions and methods described herein, the scope of the invention being indicated in the appended claims.

BRIEF DESCRIPTION OF THE DRAWINGS

The following detailed description of the preferred embodiments of the invention refers to the drawings in which.

DESCRIPTION OF THE PREFERRED EMBODIMENTS

Figure 1:
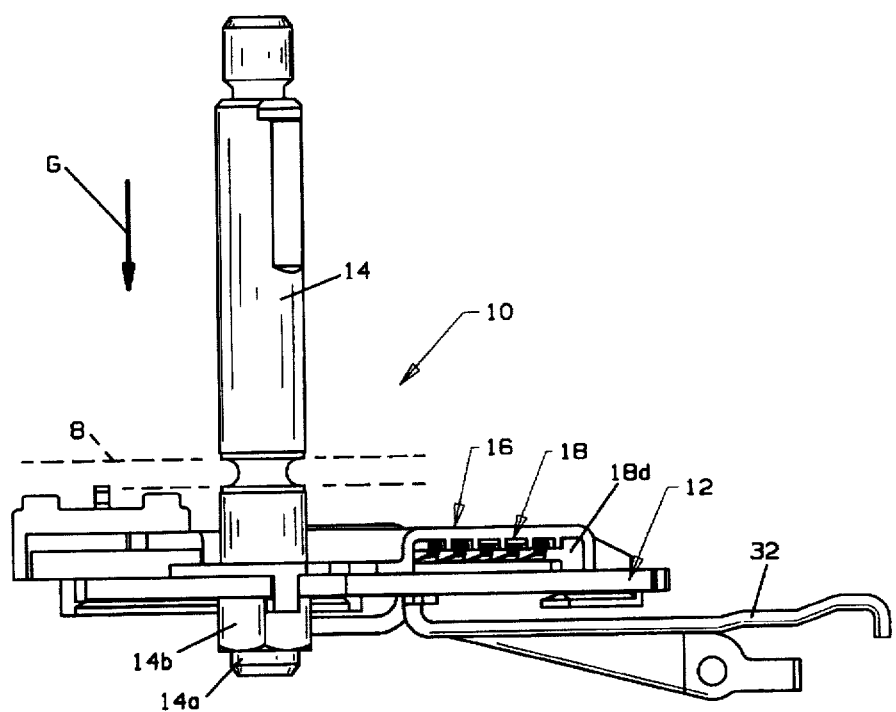
FIG. 1 is a front elevation of an electric switch assembly mounted on a manual shaft made in accordance with the invention.

With reference to FIGS. 1–4, an electric switch assembly 10 made in accordance with a preferred embodiment of the invention particularly useful in providing digital PRND321 output to the transmission power control module (PCM) of a motor vehicle, is shown. Switch assembly 10 utilizes detent lever 12 mounted within a transmission housing on manual shaft 14 which extends through wall 8 of the transmission housing. The switch assembly comprises a switch housing member 16 formed of suitable electrically insulative plastic material mounting a stationary electrical contact assembly 18, an electrically insulative base 20 mounted on detent lever 12 and a movable electrical contact assembly 22.

Housing member 16 comprises a generally flat member configured generally as a quadrant of a circle and is provided with a manual shaft receiving bore 16a at the center of the circle and a face surface 16b adapted to overlie detent lever 12 when housing 16 is received on the manual shaft. Stationary electrical contact assembly 18 is disposed in an arc-shaped recess 18a of housing 16 and comprises a plurality of elongated electrically conductive arc-shaped segments 18b embedded in plastic and exposed at selected angular position by the absence of overlying material 18d forming selected switch angles for each of segments 18b and separated from one another in a radial direction by ribs 18c which extend from the face surface of housing 16 a selected distance beyond contact segments 18b. The intended orientation of switch assembly 10 is shown in FIG. 1 so that gravity, as noted by arrow G, will act on chips and other debris to move the debris away from segments 18b. Further, ribs 18c serve to prevent shorting between adjacent contact segments caused by any chips of debris and the like present in the vicinity of the contact segments.

A plurality of generally L-shaped attachment projections 24a, 24b, 24c extend from the face surface of the housing member along the outer periphery of housing member 16 with respective legs 24d, 24e, 24f lying in a plane generally parallel to a plane in which the face surface of housing member 16 lies and spaced a selected distance therefrom extending in a direction toward bore 16a. A similar generally L-shaped locking projection 24g extends from housing member 16 adjacent bore 16a with a leg 24h extending generally in the same plane. As shown in the drawings, leg 24h also extends toward bore 16a. Contact segments 18b are electrically connected to terminals (not shown) disposed within a connector portion 16c in a conventional manner.

Electrically insulative base 20 serves as a spacer to mount movable contact assembly 22 in a selected position relative to contact assembly 18 and is provided with a plurality of posts 20a receivable in respective post receiving bores 12a in detent lever 12 extending between first and second opposed face surfaces 12b, 12c so that base 20 is mounted on first face surface 12b. Base 20 is fixed to detent lever 12 in any suitable manner as by staking over distal end portions 20b of the posts onto second face surface 12c.

Figure 3:
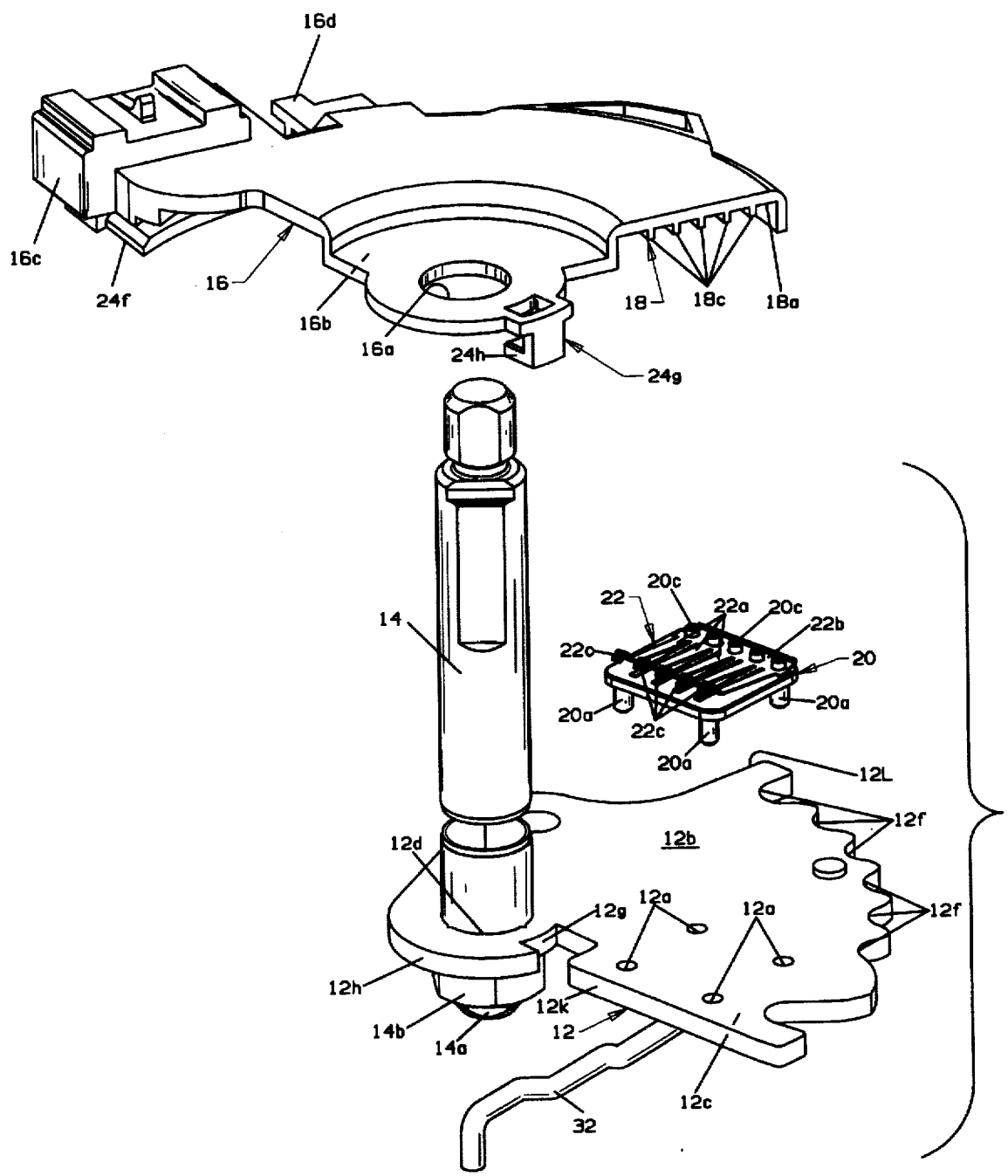
FIG. 3 is a blown apart perspective showing the FIG. 1 housing member, movable contact assembly and detent lever mounted on the manual shaft.

Movable electrical contact assembly 22 comprises a plurality of elongated electrically conductive spring elements 22a formed of suitable material such as stainless steel cantilever mounted on base 20. As seen in FIG. 3, elongated elements 22a extend from a common strip 22b which has a plurality of apertures which receive contact mounting posts of base 20 which are staked over at 20c to lock strip 22b to the base. Each elongated element 22a has a free distal end preferably formed with a bifurcated contact portion 22c. If desired, the movable contacts may be electrically connected to detent lever 12 to provide a ground connection by mounting the movable contact assembly directly on the detent lever or by using a suitable pigtail connection or the like.

Figure 5:
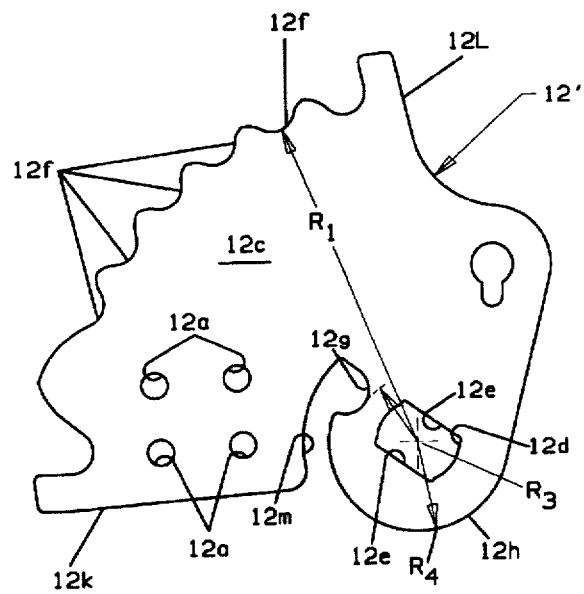
FIG. 5 as a bottom plan view of a detent lever similar to that shown in FIGS. 1–4 but having a modified cut-out portion.

Detent lever 12 is provided with a manual shaft receiving bore 12d, as shown in FIG. 5, having opposed locking flat surfaces 12e to fixedly mount manual shaft 14 to detent lever 12. Manual shaft 14 is provided with a threaded end 14a for reception of a suitable nut 14b. Detent lever 12 has a plurality of detents 12f formed in the outer peripheral edge extending radially inwardly to a point at a radius $R_1$ from the center of bore 12d (see FIG. 5) and concomitantly the longitudinal axis of manual shaft 14. Detents 12f are provided for reception of roller 26 (FIG. 2) of the transmission roller/spring assembly 28 in a conventional manner. Each detent 12f corresponds to a respective position of the manual valve and consequently to a respective gear of the transmission.

Legs 24d, 24e, 24f of the attachment projections, spaced from face surface 16b of housing member 16, extend toward bore 16a to distance $R_2$ from the center of the bore (FIG. 6) which is less than the distance $R_1$ so that upon assembly, in a manner to be explained below, the legs overlie at least a portion of second face 12c of the detent lever.

Figure 2:
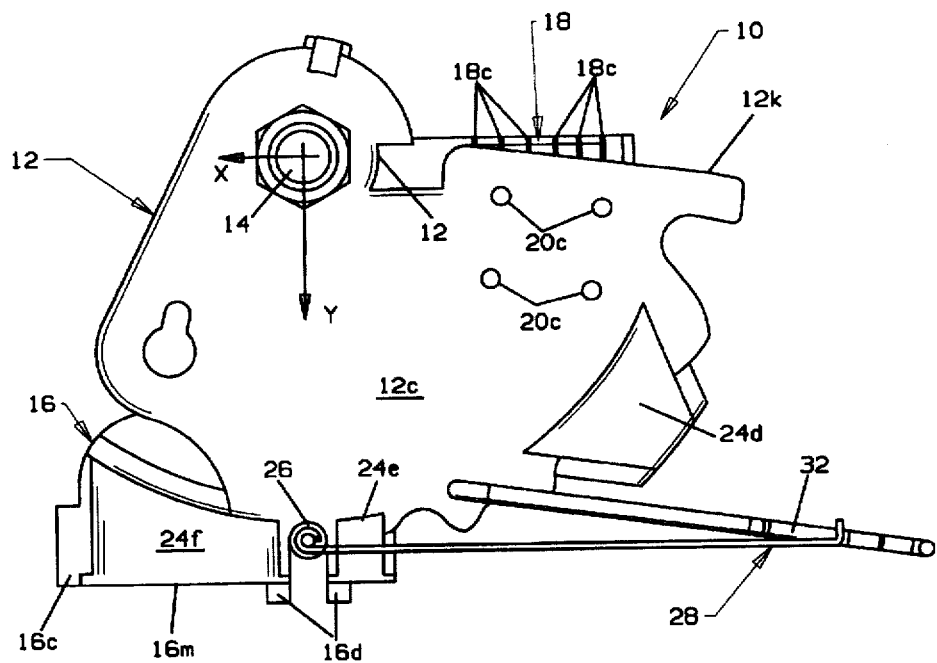
FIG. 2 is a bottom view of the FIG. 1 assembly.
Figure 4:
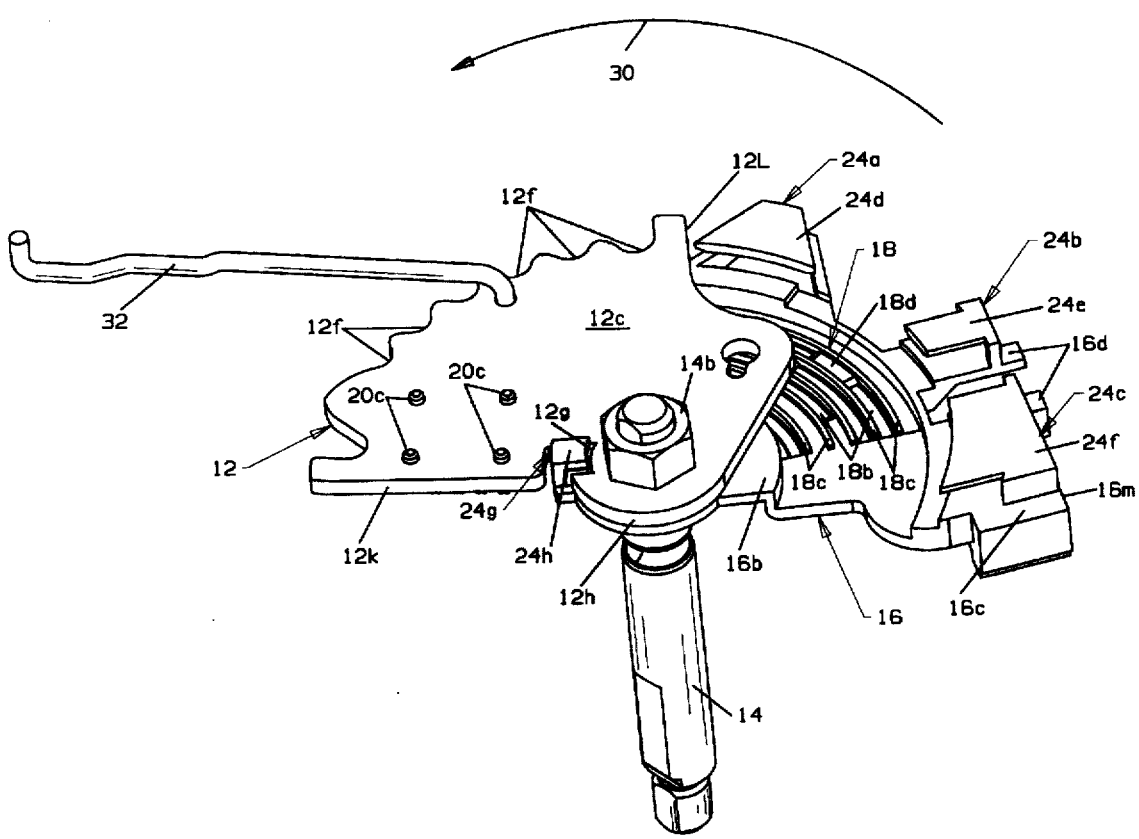
FIG. 4 as a bottom perspective of the switch assembly as it is being assembled.

Detent lever 12 is also formed with a cut-out portion 12g which extends to a distance of radius $R_3$ from the center of bore 12c which is less than radius $R^4$ which extends to an edge 12h forming a circular flange around at least a portion of bore 12d. AS seen in FIGS. 2–4, cut-out 12g extends inwardly from edge 12h toward the bore. Leg 24h of locking projection 24g of housing member 16 extends towards bore 16a to a point at a distance $R_5$ from the center of bore 16a. Locking projection 24g is located so that when housing member 16 is placed on manual shaft 14, as best seen in FIG. 4. The locking projection will be received through cut-out 12g at a selected angular position of the housing relative to detent lever 12 with attachment projections 24a, 24b, 24c out of alignment with the detent lever. Housing member 16 is then rotated in the direction of arrow 30, relative to detent lever 12, with locking leg 24h received over the circular flange portion defined by edge 12h and with legs 24d, 24e and 24f received over the detent portion of the outer peripheral edge of detent lever 12 as seen in FIG. 2.

Housing member 16 is formed with a pair of outwardly projecting prongs 16d which receive therebetween roller 26 to maintain housing member 16 in a fixed angular position in the X-Y plane (see FIG. 2) relative to the transmission while the attachment and locking projections maintain the housing member closely adjacent to the detent lever in the Z direction so that the movable contact elements 22a will provide suitable contact force while permitting rotational movement of detent lever 12 relative to housing member 16.

Figure 6:
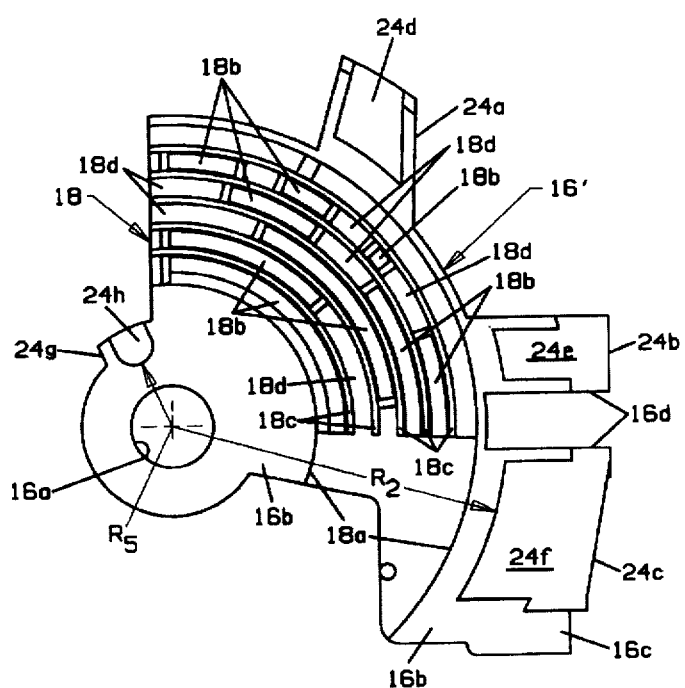
FIG. 6 as a bottom plan view of a housing member used with the FIG. 5 detent lever.

Cut-out 12g can be located, as desired, at various positions along the circular edge 12h, for example, along side edge 12k of the quadrant as shown in FIGS. 2–4, or along slot 12m shown in a modified detent lever 12' of FIG. 5. Detent lever 12' is identical to that shown in FIGS. 2–4 except for the detent of slot 12m and the location of cut-out 12g. Likewise, housing 16' of FIG. 6 is the same as that of FIGS. 2–4 except the location of locking projection 24g and leg 24h have been modified to accommodate the FIG. 5 detent lever 12'.

Electric switch assembly 10 is particularly suitable for mounting with manual shaft 14 extending generally vertically upwardly through transmission housing 8, as shown in FIG. 1 and as mentioned supra. In that position, stationary contact assembly 18 is generally horizontal and ribs 18c serve to prevent debris from short circuiting adjacent contact segments. Movable contact elements 22a wipe across the contact segments, and, upon rotation of detent lever 12, tend to push any debris which collects in the housing out the open end 18d (see FIG. 1) of the switch chamber.

Link 32, although shown in FIGS. 1–3 attached to detent lever 12, used as a manual link to connect the detent lever to the transmission manual valve in a conventional manner may be omitted, if desired.

Figure 7:
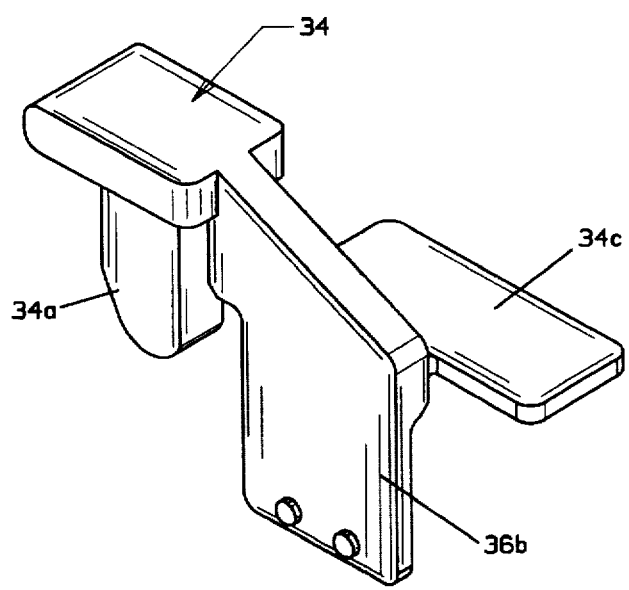
FIG. 7 is a perspective view of a removable locking member useable with the FIGS. 1–6 switch systems.

When housing member 16 is received on detent lever 12, as described above, a temporary locking mechanism may be used to maintain the switch components in a fixed position until the lever and switch assembly is installed in a transmission. As seen in FIG. 7, lock member 34, preferably formed of suitable moldable plastic material, has first and second tongues 34a, 34b extending in directions generally parallel with another. Tongue 34b is receivable through a slot formed in the upstanding portion of attachment projection 24c and abuts side edge 12l of detent lever 12 while tongue 34a is received between prongs 16d and into the detent 12f closest to the edge 12l when that detent is in alignment with the space between the prongs. Placement of lock member 34 as described prevents any relative rotational movement between housing member 16 and detent lever 12. If desired, and as shown in the drawings, a platform 34c is provided to close off opening 16m to connector portion 16c preventing ingress of foreign material and potential damage to the terminals. Platform 34c lies in a plane generally perpendicular to the planes in which the first and second tongues lie.

Figure 8:
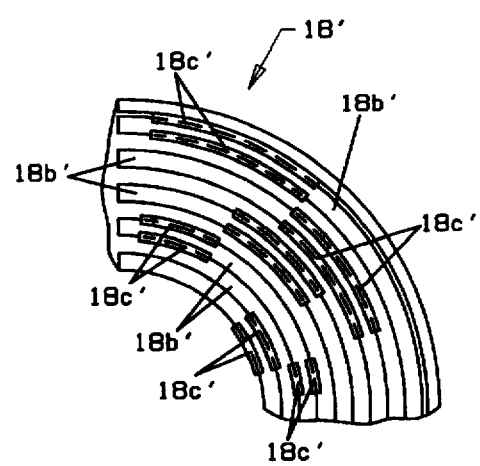
FIG. 8 as a plan view of a portion of a stationary contact assembly made in accordance with a modified embodiment.
Figure 9:
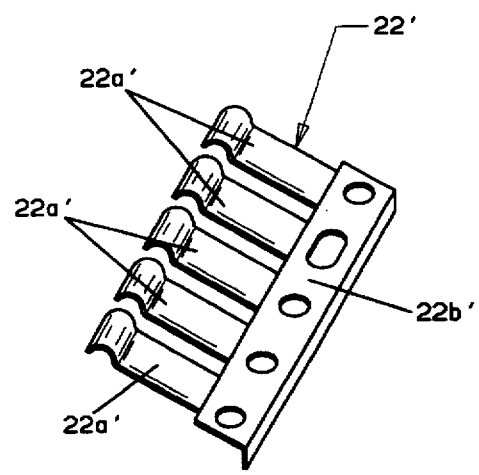
FIG. 9 as a perspective view of a movable contact assembly useful with the FIG. 8 embodiment.

In a modified embodiment, a stationary contact element assembly 18', a portion of which is shown in FIG. 8, is particularly useful with relatively higher current levels than the contact arrangement of FIGS. 1–4. Assembly 18' comprises arc-shaped contact segments 18b' along with pairs of rib-shaped rails 18c' of electrically insulative material, the rails of each pair disposed on either side of a respective contact element at selected angular positions. Movable contact assembly 22' shown in FIG. 9 comprises a plurality of elongated spring contact elements 22a' cantilever mounted from a base strip 22b'. Each contact element 22a' has a unitary distal end, in contradistinction to the bifurcated structure of the FIGS. 1–4 and has a width at least as wide as the spacing between rails 18c' of each pair. FIG. 9 shows a perspective top view of the assembly, i.e., the contact making surface. Ribs 18c' extend a selected distance above contact segments 18b' so that the contact elements are lifted away from the stationary contact segments by the rails to interrupt the circuit at selected angular positions as rotation of the detent lever causes the movable contact elements to slide by the rails.

It will be apparent to those skilled in the are that variations of the structure and method described can be made to accomplish the same purpose. All such variations within the scope of the claims are intended to be within the scope and spirit of the present invention.

What is claimed:

1. An electrical switch system for use with a motor vehicle transmission having a detent lever with opposed first and second face surfaces and a plurality of detents on a peripheral edge thereof, said plurality of detents adapted to cooperate with and receive a roller of a transmission assembly of said motor vehicle transmission for indicating a specific transmission gear selection, the detent lever being mounted on and rotatable with a manual shaft pivotable about a longitudinal axis of the manual shaft, a plurality of movable electrically conductive contact elements mounted on said first face surface of the detent lever, a housing formed of electrically insulative material having a face surface overlying the first face surface of the detent lever, the housing having a circular bore with an axis to receive the manual shaft and a pair of aligning prongs projecting outwardly from the housing to receive the roller to maintain a selected angular orientation of the housing relative to a transmission housing, a plurality of elongated arc-shaped stationary electrically conductive contact segments mounted on the face surface of the housing, the stationary contact segments extending a selected distance from the face surface of the housing and being separated from one another by respective arc-shaped ribs of electrically insulative material extending a distance from the face of the housing greater than the selected distance, each movable contact element movable into and out of engagement with a respective stationary contact segment upon a selected degree of rotation of the manual shaft.

2. An electric switch system according to claim 1 in which the movable contact elements are cantilever mounted spring elements.

3. An electric switch system according to claim 2 in which the movable contact elements have a bifurcated distal free end.

4. An electric switch system according to claim 1 in which the arc-shaped ribs comprise pairs of aligned, electrically insulative rails extending from the face surface of the housing, one of a pair disposed on each side of a respective stationary contact segment along at least a portion of the length of each respective stationary contact segment and the movable contact elements are cantilever mounted spring elements, the spring elements each having a distal end portion biased toward the face surface of the housing and having a width at least as wide as the spacing between the rails of each respective pair, the spring elements being aligned with respective stationary contact segments.

5. An electric switch system according to claim 1 further comprising a plurality of attachment projections and a locking projection extending from the housing, the attachment projections having a portion extending beyond the peripheral edge of the face surface and overlying the second face surface of the detent lever and the locking projection received through a cut-out in the detent lever and having a portion overlying the second face surface of the detent lever.

6. An electric switch system according to claim 5 in which the stationary contact segments are arc-shaped generally forming a quadrant of a circle, the detents of the detent lever are disposed generally a distance $R_1$ from the longitudinal axis of the manual shaft, the portion of the attachment projections overlying the second face surface of the detent lever extends a distance $R_2$ from the axis of the manual shaft receiving bore of the housing, distance $R_2$ being less than distance $R_1$, the detent lever having a flange surface with a portion of a circular edge around the manual shaft having a radius $R_4$ from the longitudinal axis, the cut-out formed through the detent lever at a distance $R_3$ from the longitudinal axis, the distance $R_3$ being less than radius $R_4$ and the locking projection extending at a distance $R_5$ slightly more than distances $R_3$ so that the locking projection can be received through the cut-out and will overly the second face of the detent lever, the locking projection received through the cut-out when the detent lever is at an angular orientation such that the attachment projections are out of alignment with the detent lever and, upon selected rotation of the housing relative to the detent lever the locking projection will extend over the flange surface and the attachment projections will be aligned with the detent lever.

7. An electric switch according to claim 1 in which a plurality of post receiving apertures are formed through the detent lever, and further comprising a base of electrically insulative material, the plurality of movable contact elements being mounted on the base, the base having a plurality of posts depending therefrom, the posts being received through respective apertures, the posts having distal end portions staked over the second face surface of the detent lever to lock the base to the detent lever.

8. An electric switch according to claim 5 including a removable locking member having a first tongue received between the prongs and in a detent of the detent lever and one of the attachment projections includes a slot, the locking member having a second tongue received in the slot of the attachment projection.

9. A method for mounting a housing member on a rotatable plate configured generally as a quadrant of a first circle with a shaft fixedly attached to the plate at a location corresponding to the center of the first circle, the plate having first and second face surfaces and an outer peripheral edge formed with a plurality of detents and the housing formed with a bore for rotatably receiving the shaft comprising the steps of forming a plurality of generally L-shaped attachment projections extending from an outer portion of the housing and having a leg extending over a face surface of the housing toward the bore a selected distance and being spaced from the face surface, the attachment projections being located so that the shaft can be received in the bore with the housing disposed in an angular position such that the attachment projections are out of alignment with the plate and then rotated to an angular position where the leg of each attachment projection extends over at least a portion of the second face surface of the plate, forming a cut-out through the plate in communication with an edge of a flange formed about the shaft, the edge extending along a portion of a second circle having a radius R, the second circle having a center coaxial with the longitudinal axis of the shaft, the cut-out having a portion located at a distance from the longitudinal axis different from the radius R, forming a locking, generally L-shaped projection extending from the housing and having a leg extending in a plane generally parallel to a plane in which the face of the housing lies, the locking projection being located so that it is receivable in the cut-out of the plate when the plate is in an angular orientation relative to the housing such that the plurality of attachment projections are out of alignment with the plate and then when the housing is rotated so that the attachment projections are in alignment with the plate and extend over the second face of the plate the locking projection extends over the second face of the plate along the flange.

10. A method according to claim 9 in which the leg of the locking projection extends in a direction toward the longitudinal axis.

11. An electrical switch system for use with a motor vehicle transmission having a detent lever with opposed first and second face surfaces and a plurality of detents on a peripheral edge thereof, said plurality of detents adapted to cooperate with and receive a roller of a transmission assembly of said motor vehicle transmission for indicating a specific transmission gear selection, the detent lever being mounted on and rotatable with a manual shaft pivotable about a longitudinal axis of the manual shaft, a plurality of movable electrically conductive contact elements mounted on said first face surface of the detent lever, a housing formed of electrically insulative material having a face surface overlying the first face surface of the detent lever, the housing having a circular bore with an axis to receive the manual shaft, a plurality of attachment projections and a locking projection extending from the housing, the attachment projections having a portion extending beyond the peripheral edge of the detent lever and overlying said second face surface of the detent lever and the locking projection received through a cut-out in the detent lever and having a portion overlying the second face surface of the detent lever and a plurality of stationary electrically conductive contact segments mounted on the face surface of the housing, each movable contact movable into and out of engagement with a respective stationary contact segment upon a selected degree of rotation of the manual shift.

12. An electric switch system according to claim 11 in which the stationary contact segments are arc-shaped generally forming a quadrant of a circle, the detents of the detent lever are disposed generally a distance $R_1$ from the longitudinal axis of the manual shaft, the portion of the attachment projections overlying the second face surface of the detent lever extends a distance $R_2$ from the axis of the manual shaft receiving the bore of the housing, distance $R_2$ being less than distance $R_1$, the detent lever having a flange surface with a portion of a circular edge around the manual shaft having a radius $R_4$ from the longitudinal axis, the cut-out formed through the detent lever at a distance $R_3$ from the longitudinal axis, the distance $R_3$ being less than radius $R_4$ and the locking projection extending at a distance $R_5$ slightly more than distances $R_3$ so that the locking projection can be received through the cut-out and will overly the second face of the detent lever, the locking projection received through the cut-out when the detent lever is at an angular orientation such that the attachment projections are out of alignment with the detent lever and, upon selected rotation of the housing relative to the detent lever the locking projection will extend over the flange surface and the attachment projections will be aligned with the detent lever.

* * * * *